I. E. ASH.
TIRE.
APPLICATION FILED JAN. 10, 1916.

1,210,132.

Patented Dec. 26, 1916.

Isaac E. Ash
Inventor

Witnesses

UNITED STATES PATENT OFFICE.

ISAAC E. ASH, OF ATHENS, OHIO.

TIRE.

1,210,132. Specification of Letters Patent. Patented Dec. 26, 1916.

Application filed January 10, 1916. Serial No. 71,306.

*To all whom it may concern:*

Be it known that I, ISAAC E. ASH, a citizen of the United States, residing at Athens, in the county of Athens and State of Ohio, have invented certain new and useful Improvements in Tires, of which the following is a specification.

My invention relates to improvements in tires and refers particularly to what may be termed a reinforced antiskid tire.

An object of my invention is the provision of a pneumatic tire having an antiskid tread thereon composed of closely woven fiber such as hemp, Manila, flax, cotton, linen or other tough fiber, which will prevent skidding and prolong the life of the tire.

A further object of my invention is the provision of a pneumatic tire, having a tread of closely woven tough fiber folded and laced together in a tortuous line with continuous return bends and secured in the outer rubber portion of the tire.

With these and other objects in view, my invention consists of a reinforced antiskid pneumatic tire embodying novel features of construction, combination and arrangement of parts for service, substantially as shown, described and particularly defined by the claims.

In the accompanying drawing, I have illustrated one complete example of the physical embodiment of my invention constructed in accordance with the best mode I have so far devised for the practical application of the principles of my invention.

Figure 1:
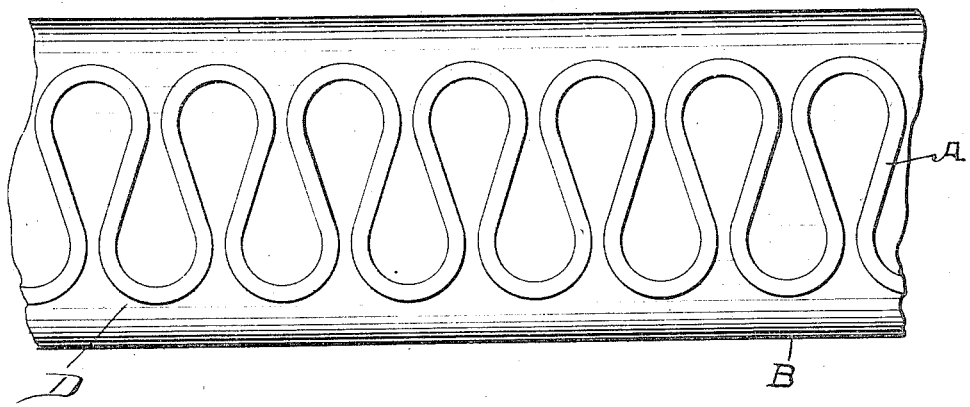
Figure 2:
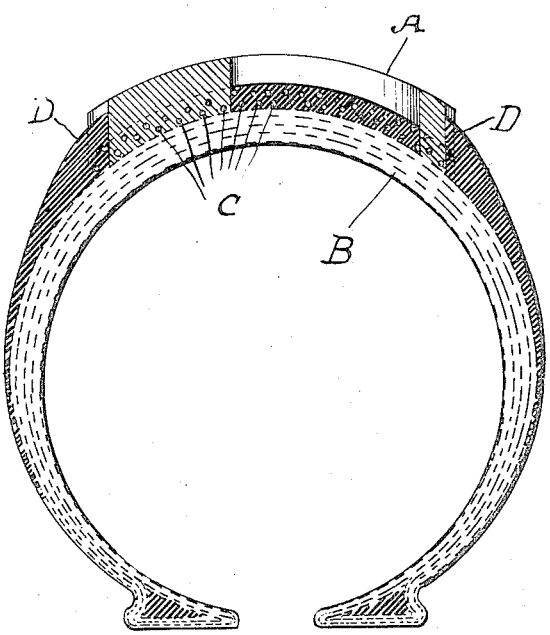

Figure 1 is a top plan view of a portion of my tire, and Fig. 2 is a transverse sectional view thereof.

I have found from experience with and a close observation of the comparative wearing qualities of rubber and fiber, that a tough fiber such as hemp, Manila, flax, cotton, linen, etc., woven tightly together will outwear rubber when used as the antiskid tread.

In the drawings, A designates the continuous fiber strip laced together and securely held in the tire B, in a tortuous line with continuous return bends by the wires or strong cords C. As shown in Fig. 2, the wires or strong cords C pass through the strip A and the outer rubber tread D of the tire B, thus securely retaining the strip in place. The strip A is reinforced at its sides by the rubber tread D, which is raised almost flush with the top of the strip. I have found that the best results can be obtained by making the strip A from about three-eighths of an inch to five-eighths of an inch in thickness and by having the folds or bends of the strip of fiber close enough together to receive all the contact with the ground.

In the present invention a new type of tread face is attained combining the advantages of a rubber tread with the advantages of a tread having material with a better coefficient of friction for wet and slippery surfaces. To this end, the strip A is composed of fiber cords woven very tightly together, and is set in the tire at the time of its manufacture by the lacings of wires running through the successive folds and bends of the strip with the circumference of the tire. The usual rubber tread filling the spaces between the folds and the outsides of the bends and engaging the wires, thereby anchoring the strip in the tire. In this manner I will have a tire whose tread will consist of a strip of closely woven fiber so disposed and anchored in the rubber portion of the tire that the ends of the strands composing the woof of the fiber strip receive practically all the hard contact with the road surface. Thus it will be readily seen that the ends of the fiber composing the woof of the strip, together with the raised rubber reinforcement, compose or afford the only points of contact of the tire with the road surface, and that when the strip and the raised rubber reinforcement have worn out the tire may be refitted with another strip of fiber and reinforcing rubber as in the new tire.

As is well known to those skilled in the art to which this invention appertains, the rubber tread together with the fiber strip may be removed and the fabric carcass refitted with a new strip and rubber tread as in a new tire.

I claim:—

1. A tire of the character described, consisting of the usual fabric carcass and outer rubber tread thereon, an antiskid strip imbedded in the outer rubber tread in a tortuous line with continuous return bends, and means for anchoring the antiskid strip in the outer rubber tread consisting of lacings passing through the strip at its successive folds and bends and through the outer rubber tread.

2. A tire of the character described, consisting of the usual fabric carcass having an outer rubber tread thereon, an antiskid strip embedded in said rubber tread in a tortuous line with continuous return bends, and lacings passing through the antiskid strip at its successive folds and bends and through the outer rubber tread longitudinally around the tire, said lacings securely anchoring the strip in the tire.

3. The combination with a tire consisting of the fabric carcass and the rubber tread thereon, of an antiskid strip embedded therein composed of closely woven fiber strands and disposed in said rubber tread in a tortuous line with continuous return bends, and means for anchoring the antiskid strip in the tread consisting of lacings passing through the successive folds and bends of the strip and the rubber tread, said rubber tread being almost flush with the outer sides of the strip to act as a reinforcement.

In testimony whereof I affix my signature in the presence of two witnesses.

ISAAC E. ASH.

Witnesses:
GEO. M. OSBORN,
JOSEPH MINOR.